United States Patent
El Baraka et al.

(10) Patent No.: US 9,662,966 B2
(45) Date of Patent: May 30, 2017

(54) DEVICE FOR HYBRID VEHICLE WITH ANTI-DUST FLANGE BETWEEN ELECTRIC MACHINE AND REACTION PLATE

(71) Applicant: VALEO EQUIPEMENTS ELECTRIQUES MOTEUR, Creteil (FR)

(72) Inventors: Khadija El Baraka, Serris (FR); Svetislav Jugovic, Athis-Mons (FR)

(73) Assignee: Valeo Equipements Electriques Moteur (FR)

( * ) Notice: Subject to any disclaimer, the term of this patent is extended or adjusted under 35 U.S.C. 154(b) by 202 days.

(21) Appl. No.: 14/427,337

(22) PCT Filed: Sep. 20, 2013

(86) PCT No.: PCT/FR2013/052183
§ 371 (c)(1),
(2) Date: Mar. 11, 2015

(87) PCT Pub. No.: WO2014/049246
PCT Pub. Date: Apr. 3, 2014

(65) Prior Publication Data
US 2015/0239334 A1 Aug. 27, 2015

(30) Foreign Application Priority Data

Sep. 25, 2012 (FR) ...................................... 12 58978
May 22, 2013 (FR) ...................................... 13 54594

(51) Int. Cl.
*H02K 5/10* (2006.01)
*H02K 7/108* (2006.01)
(Continued)

(52) U.S. Cl.
CPC .................. *B60K 6/40* (2013.01); *B60K 6/26* (2013.01); *B60K 6/387* (2013.01); *B60L 11/14* (2013.01);
(Continued)

(58) Field of Classification Search
CPC .. H02K 1/12; H02K 5/00; H02K 5/02; H02K 5/04; H02K 5/10; H02K 7/11;
(Continued)

(56) References Cited

U.S. PATENT DOCUMENTS 4,671,125 A * 6/1987 Yabunaka ............... F02N 15/06
290/48
4,936,428 A * 6/1990 Leigh-Monstevens . F16D 28/00
192/111.16
(Continued)

FOREIGN PATENT DOCUMENTS

DE 19934936 2/2000
DE 10103795 8/2001
(Continued)

*Primary Examiner* — Burton Mullins
(74) *Attorney, Agent, or Firm* — Berenato & White, LLC

(57) ABSTRACT

A device for a motor vehicle transmission assembly, comprising:—an electric machine (3) comprising a rotor (9) able to rotate about an axis X and a stator (8), the rotor (9) being arranged inside the stator (8), separated from the stator (8) by an annular air gap space (300),—a clutch (2) coaxial with the electric machine comprising a reaction plate (10), the reaction plate (10) rotating as one with the rotor (9) and being positioned an axial distance from said rotor (9) in order to leave space between the electric machine (3) and the reaction plate (10), the assembly being fitted with a dust ring (301) positioned axially in the space between the electric machine (3) and the reaction plate (10) and extending radially far enough to cover the annular air gap space (300).

22 Claims, 12 Drawing Sheets

(51) Int. Cl.
    *B60K 6/40*           (2007.10)
    *B60K 6/387*         (2007.10)
    *B60K 6/26*           (2007.10)
    *B60L 11/14*         (2006.01)
    *H02K 3/28*           (2006.01)
    *H02K 3/52*           (2006.01)

(52) U.S. Cl.
    CPC ............... *H02K 3/28* (2013.01); *H02K 3/522*
    (2013.01); *H02K 5/10* (2013.01); *H02K 7/108*
    (2013.01); *B60Y 2400/4242* (2013.01); *H02K*
    *2203/06* (2013.01); *H02K 2203/09* (2013.01);
    *H02K 2203/12* (2013.01); *Y02T 10/641*
    (2013.01); *Y02T 10/70* (2013.01); *Y02T*
    *10/7077* (2013.01); *Y10S 903/906* (2013.01);
    *Y10S 903/914* (2013.01); *Y10S 903/951*
                                                                  (2013.01)

(58) Field of Classification Search
    CPC ........ H02K 7/108; H02K 11/01; F16D 13/72;
                 F16D 2300/0212; F16D 2003/08; B60K
                 6/40; B60K 6/405; B60K 6/26
    USPC ............ 310/78, 112, 113, 88, 89; 192/113.1,
                                                      192/113.2
    See application file for complete search history.

(56) References Cited

U.S. PATENT DOCUMENTS

| | | |
|---|---|---|
| 5,141,091 A | 8/1992 | Perez et al. |
| 6,116,364 A * | 9/2000 | Taguchi ................. B60K 6/405 |
| | | 180/165 |
| 6,373,155 B1 * | 4/2002 | Shimizu .................... B60K 6/26 |
| | | 310/254.1 |
| 6,455,968 B2 * | 9/2002 | Honorio ................. B60K 6/387 |
| | | 180/294 |
| 6,561,336 B1 * | 5/2003 | Huart ....................... F02B 63/04 |
| | | 123/179.28 |
| 6,628,021 B2 * | 9/2003 | Shinohara ................ B60K 6/26 |
| | | 310/68 B |
| 8,459,425 B2 * | 6/2013 | Ruder ....................... B60K 6/40 |
| | | 192/48.603 |
| 2010/0237726 A1 | 9/2010 | Hayakawa et al. |
| 2011/0031838 A1 | 2/2011 | Serra et al. |
| 2011/0162480 A1 | 7/2011 | Ruder et al. |
| 2011/0224043 A1 | 9/2011 | Bachmann et al. |
| 2011/0259698 A1 | 10/2011 | Arnold et al. |

FOREIGN PATENT DOCUMENTS

| | | |
|---|---|---|
| DE | 102010054545 | 8/2011 |
| DE | 102011107144 | 2/2012 |
| DE | 102010050685 | 5/2012 |
| EP | 0831580 | 3/1998 |
| EP | 1107433 | 6/2001 |
| EP | 1279828 | 1/2003 |
| EP | 2311680 | 4/2011 |
| FR | 2473140 | 7/1981 |
| FR | 2619880 | 3/1989 |
| FR | 2745444 | 8/1997 |
| FR | 2751275 | 1/1998 |
| FR | 2797472 | 2/2001 |
| FR | 2830589 | 4/2003 |
| FR | 2881382 | 8/2006 |
| FR | 2881494 | 8/2006 |
| WO | WO2006061349 | 6/2006 |
| WO | WO2010079273 | 7/2010 |

* cited by examiner

DEVICE FOR HYBRID VEHICLE WITH ANTI-DUST FLANGE BETWEEN ELECTRIC MACHINE AND REACTION PLATE

CROSS-REFERENCE TO RELATED APPLICATIONS AND CLAIM TO PRIORITY

This application is a national stage application of International Application No. PCT/FR2013/052183 filed Sep. 20, 2013, which claims priority to French Patent Application No. 1258978 filed Sep. 25, 2012 and French Patent Application No. 1354594 filed May 22, 2013, of which the disclosures are incorporated herein by reference and to which priority is claimed.

TECHNICAL FIELD

The invention relates to the field of transmissions for motor vehicles. In particular, it relates to a device for a transmission assembly which is designed to be arranged between an internal combustion engine and a gearbox of a motor vehicle.

In particular it concerns a transmission assembly for a motor vehicle of the hybrid type, in which an electrical machine is arranged in the transmission chain between the engine and the gearbox.

TECHNOLOGICAL BACKGROUND

Transmission assemblies for hybrid motor vehicles are known comprising two clutches and an electrical machine, arranged between the internal combustion engine of the vehicle and its gearbox. An assembly of this type is described for example in document FR 2 830 589. Each of the clutches comprises a friction disc, a clutch stop, a reaction plate, and a clutch mechanism, comprising a pressure plate which is fitted such as to be mobile axially relative to the said reaction plate, between an engaged position in which the friction disc is gripped between the said pressure and reaction plates, and a released position. The two clutches are arranged on both sides of the electrical machine. The mechanism of a first clutch, which is arranged on the engine side, is configured to be associated with the crankshaft of the internal combustion engine. The friction disc of the first clutch is fitted integrally in rotation with an intermediate shaft which is secured on a hub for support of the rotor of the electrical machine. The mechanism, as well as the reaction plate of the second clutch, arranged on the gearbox side, are fitted integrally in rotation with the said hub for support of the rotor, and the friction disc of the said second clutch is designed to co-operate with an input shaft of a gearbox.

The clutch on the engine side thus makes it possible to couple the crankshaft of the combustion engine in rotation with the rotor of the electrical machine, and the clutch on the gearbox side makes it possible to couple the rotor with the input shaft of the gearbox. Thus, it is possible to cut off the internal combustion engine at each stoppage, and to restart it by means of the electrical machine. The electrical machine can also constitute an electric brake, or supply additional energy to the combustion engine in order to assist it, or prevent it from stalling. When the engine is running, the electrical machine acts as an alternator.

The reaction plate of the clutch on the gearbox side is placed at an axial distance from the electrical machine, in order to limit the magnetic disturbances. However, on the other hand, dust or particles, produced in particular by the rubbing of the friction disc of the clutch on its respective pressure and reaction plates during clutch operations, are liable to access the air gap of the electrical machine. This dust is liable to damage the electrical machine and detract from its performance.

SUMMARY

A concept on which the invention is based is to protect the air gap between the rotor and the stator of an electrical machine against dust produced during clutch operations.

For this purpose, according to one embodiment, the invention proposes a device for a transmission assembly of a motor vehicle comprising:
  an electrical machine comprising a rotor which is mobile in rotation around an axis X and a stator, the rotor being arranged in the interior of the stator, separated from the stator by an annular air gap space;
  a clutch which is coaxial with the electrical machine, comprising a reaction plate, the reaction plate being integral in rotation with the rotor, and placed at an axial distance from the said rotor, in order to provide a space between the electrical machine and the reaction plate, the said assembly being equipped with an anti-dust flange which is arranged axially in the space between the electrical machine and the reaction plate, and extends radially so as to cover the annular air gap space.

According to some embodiments, a device of this type can comprise one or more of the following characteristics:
  the flange is secured on the stator;
  the radial part of the said flange forms a cheek, the said flange comprising a lip which extends axially from the cheek in the direction of the reaction plate. Thus, the said lip contributes towards reducing further the passage of the dust towards the air gap of the electrical machine;
  the said flange comprises a second axial lip which extends from the cheek in the direction of the reaction plate;
  the first and second lips are arranged radially on both sides of the annular air gap space;
  the axial distance between the electrical machine and the reaction plate is not constant, with a gap between the reaction plate and the stator having an axial dimension greater than the axial dimension of a gap between the reaction plate and the rotor, the first lip being arranged between the reaction plate and the rotor, and the second lip being arranged between the reaction plate and the stator, and having an axial dimension greater than the gap between the reaction plate and the rotor. An arrangement of this type forms a baffle which reduces the passage of the dust towards the air gap;
  on its outer periphery, the flange comprises a conical deflector which widens towards the exterior in the direction of the clutch. This deflector makes it possible to confine the dust generated by the clutch on the gearbox side, between the gearbox and the electrical machine;
  the stator comprises a plurality of assembly pins, and the flange comprises a plurality of holes arranged at right angles to the pins, thus permitting assembly by coupling of the pins with the corresponding holes;
  the pins which pass through the holes in the flange comprise a head which retains the flange on the stator. Thanks to these characteristics, the assembly of the flange by means of pins is simple and economical;
  the pins are made of plastic which is fusible by ultrasound. Thus, the flange can be secured on the stator by means of an ultrasound welding process, the implementation of which is particularly rapid;

according to one embodiment, the flange is non-magnetic. An arrangement of this type makes it possible to limit the magnetic leakages towards the said flange;

according to another embodiment, the flange is designed to ensure magnetic shielding of the electrical machine. Thus, the flange forms a magnetic screen which channels the magnetic fields and limits their propagation. In addition, a magnetic screen of this type makes it possible to limit the attraction of metal dust from the clutch towards the air gap;

the flange has low electrical conductivity, in order to prevent power losses caused by the currents induced in the rotor;

according to one embodiment, the flange is made of an electrically insulating material;

the flange is made of a material with magnetic susceptibility with a value of less than $1 \cdot 10^{-3}$;

the flange is made of plastic material comprising non-magnetic metal fillers.

BRIEF DESCRIPTION OF THE FIGURES

The invention will be better understood, and other objectives, details, characteristics and advantages of it will become more clearly apparent, from the following description of several particular embodiments of the invention, provided purely by way of non-limiting illustration, with reference to the appended drawings.

DETAILED DESCRIPTION OF EMBODIMENTS

In the description and the claims, use will be made of the terms "outer", "inner", "front", "rear", as well as of the orientations "axial" and "radial" in order to designate elements of the transmission assembly according to the definitions given in the description.

By convention, the "radial" orientation faces at right angles to the axis X of rotation of the assembly which determines the "axial" orientation. The "circumferential" or "tangential" orientation faces at right angles to the axis X of the assembly and at right angles to the radial direction.

The terms "outer" and "inner" are used to define the position of one element relative to another according to the radial direction, with reference to the axis X. An element close to the axis is thus qualified as inner, as opposed to an outer element which is situated radially on the periphery. The terms "front" and "rear" are used to define the position of an element relative to another according to the axial direction, with an element close to the thermal engine being designated by front, as opposed to an element close to the gearbox which is designated by rear.

Figure 1:
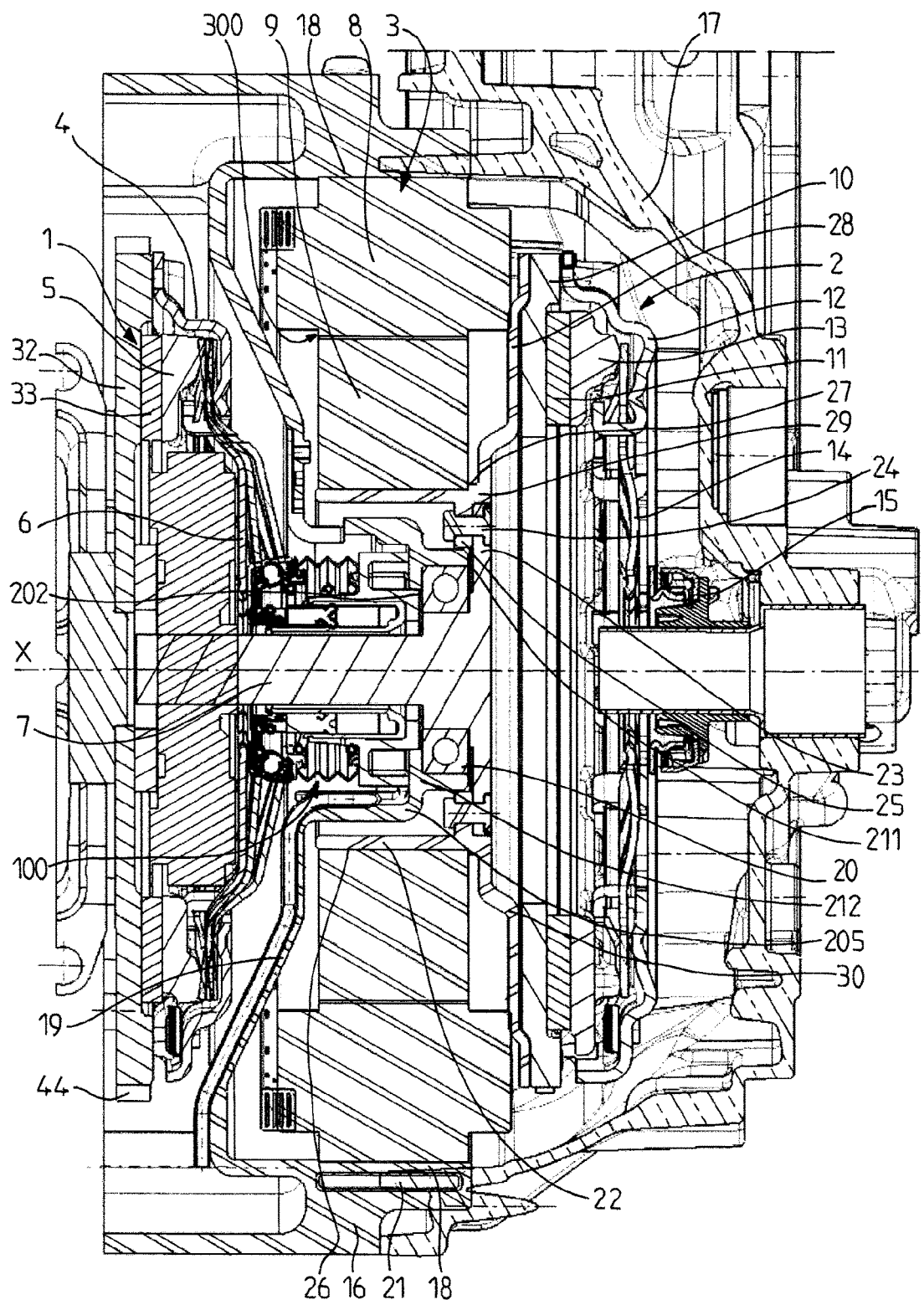
FIG. 1 is a view in axial cross-section of a transmission assembly comprising two clutches and an electrical machine, which assembly is designed to be arranged between an internal combustion engine and a gearbox.
Figure 2:
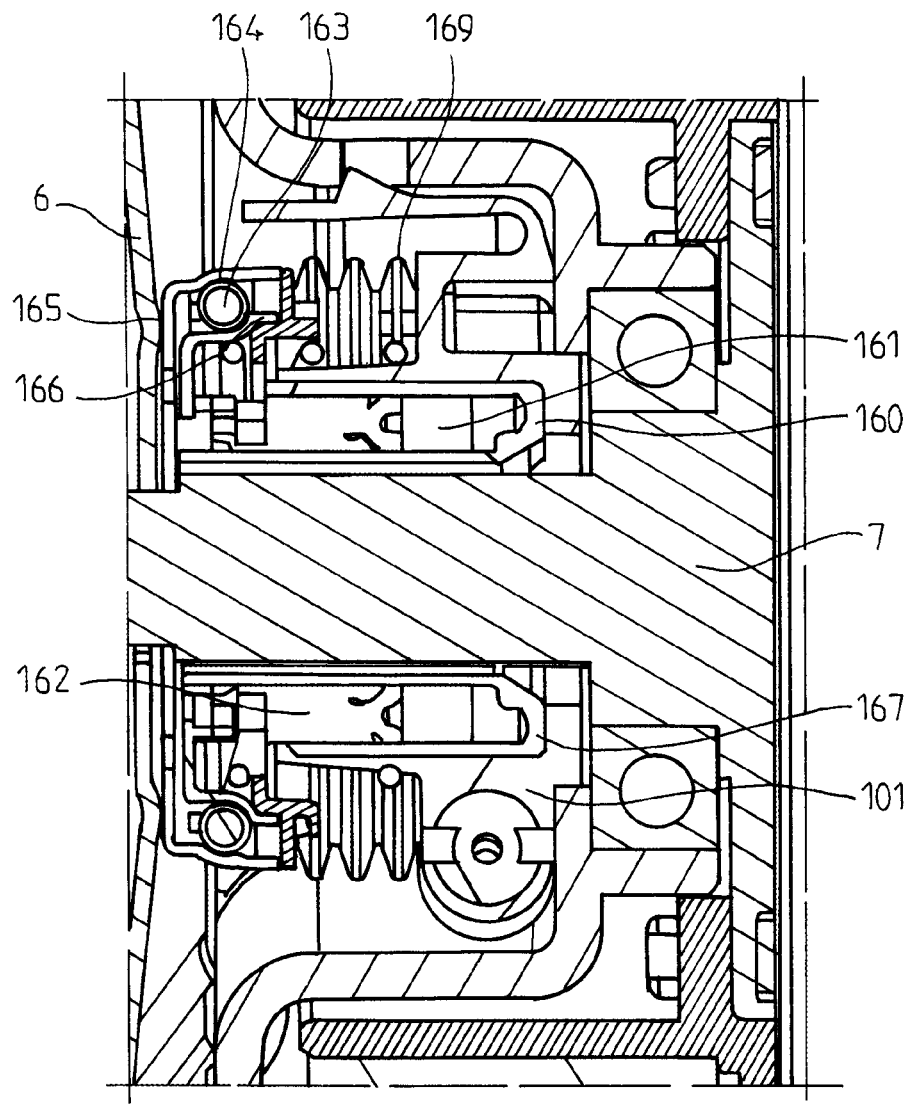
FIG. 2 is a view in axial cross-section of a hydraulically controlled clutch stop for actuation of the clutch on the engine side.

FIG. 1 shows a transmission assembly which is designed to be arranged between a combustion engine and a gearbox, comprising a clutch 1 on the engine side, a clutch 2 on the gearbox side, and an electrical machine 3 comprising a stator 8 and a rotor 9.

The clutch 1 on the engine side makes it possible to couple or uncouple in rotation the crankshaft of the combustion engine, not represented, relative to the rotor 9 of the electrical machine 2. The clutch 2 on the gearbox side makes it possible to couple or uncouple in rotation the rotor 9 of the electrical machine 3 relative to an input shaft of the gearbox, not represented. The assembly can thus transmit torque between the crankshaft of the thermal engine and the input shaft of the gearbox.

The electrical machine 3 is a reversible rotary electrical machine of the alternator-starter or motor-generator type. In starter mode, the clutch 1 on the engine side is engaged, and the electrical machine 3 makes it possible to start the thermal engine. In alternator mode, the electrical machine 3 makes it possible to recharge a battery of the vehicle, and/or to supply the units or equipment which consume energy when the thermal engine is running. It is also configured to recuperate energy during braking of the vehicle. In particular, the electrical machine 3 can be configured to stop the thermal engine, for example at a red light or in traffic jams, and then to restart it (stop and go function). According to one embodiment, it can supply additional energy, which makes it possible to prevent the engine from stalling (boost function). In addition, the electrical machine 3 can drive the vehicle at least for a short distance, with the clutch 1 on the engine side then being released and the thermal engine stopped.

The clutch 1 on the engine side comprises a reaction plate 32 supported by an engine flywheel which is designed to be fitted on the crankshaft, a friction disc 33 and a clutch mechanism comprising a cover 4 which is secured on the reaction plate 32, a pressure plate 5 and a diaphragm 6. The friction disc 33 comprises a ribbed hub which co-operates with ribbing formed on an intermediate shaft 7.

The pressure plate 5 is connected in rotation to the cover 4 by resilient tangential tongues with axial action, not illustrated, which permit axial movement of the pressure plate 5 relative to the reaction plate 32. Thus, the pressure plate 5 is mobile relative to the reaction plate 32, between an engaged position, in which the friction disc is gripped between the said pressure 5 and reaction 32 plates, and a released position.

In the engaged position the clutch 1 is engaged, and the torque is transmitted from the crankshaft to the intermediate shaft 7 via the first clutch 1. The diaphragm 6 is in contact, firstly on its inner periphery with a clutch stop 100, and secondly with a boss of the pressure plate 5. The diaphragm 6 thrusts the pressure plate 5 in the direction of the reaction plate 32.

In order to release the clutch 1, the clutch stop 100 displaces the inner periphery of the diaphragm axially forwards, such as to make the diaphragm 6 tilt. Thus, the load exerted by the diaphragm 6 on the pressure plate 5 decreases, so that the pressure plate 5 is returned rearwards under the action of the resilient tangential tongues.

The clutch 2 on the gearbox side comprises a reaction plate 10, which is integral in rotation with the intermediate shaft 7, a friction disc 11 and a clutch mechanism comprising a cover 12 which is secured on the reaction plate 10, a pressure plate 13 which is mobile axially relative to the reaction plate 10, between an engaged position and a released position, and a diaphragm 14. The clutch 2 on the gearbox side is also equipped with resilient tangential tongues which connect the pressure plate 13 in rotation to the cover 12.

The friction disc 11 is equipped with a ribbed hub which is designed to co-operate with ribbing formed at the end of the input shaft of the gearbox, not represented. A clutch stop 15 makes it possible to tilt the diaphragm 14 in order to release the clutch 2.

In order to ensure thermal dissipation of the calories generated locally by rubbing of the friction linings of the clutch disks 3, 11 on the pressure 5, 13 and reaction 32, 10 plates of the clutches 1, 2, the said pressure 5, 13 and reaction 32, 10 plates are typically made of cast iron.

The reversible rotary electrical machine 3 comprises an outer stator 8 and an inner rotor 9. The outer stator 8 of the electrical machine surrounds the inner rotor 9. An annular air gap space 300 extends between the inner periphery of the stator 8 and the outer periphery of the rotor 9. The rotor 9 has a central opening which permits the passage of the intermediate shaft 7.

The stator 8 is supported by a support element 16, which is firstly designed to be secured on the engine block, and secondly designed to be secured on the housing 17 of the gearbox. The support element 16 is inserted between the housing of the gearbox and the engine block, and is designed to permit securing of the gearbox on the engine block. In other words, the support element forms to some extent a brace between the engine block and the housing 17 of the gearbox.

The support element 16 comprises an outer peripheral wall 18, the inner surface of which has a cylindrical form, in order to co-operate with the outer periphery of the stator 8. The stator 8 can be fitted in the support element 16 by sintering or by force fitting. The support element 16 also has an inner ring 19, which extends at the front of the stator 8 and the rotor 9, and forms a separation wall between the clutch 1 on the engine side on the one hand, and the electrical machine 3 on the other hand. The distance between the inner ring 19 and the rotor 9 is optimised so as to prevent losses of induced current which would give rise to reductions of power of the electrical machine.

The support element 16 also defines a receptacle 201 which extends in the interior of the rotor 9 and inside which there extends at least partially the clutch stop 100 of the clutch 1 on the engine side. An arrangement of this type makes it possible to optimise the axial size of the assembly. The receptacle 201 is defined by an axial skirt 205 and a base 212 with radial orientation. The base 212 is provided with a bore 202 which permits the passage of the intermediate shaft 7.

In addition, an axial rim 211 extends from the base 212 of the receptacle rearwards, and forms together with the rear surface of the base 212 of the receptacle 201 a cylindrical bore for accommodation of a bearing 20. In other words, the base 212 of the receptacle 201 delimits on the engine side the cylindrical bore for accommodation of the bearing 20, and defines a front radial support surface for the bearing 20.

The bearing 20 also co-operates with the intermediate shaft 7, thanks to a shoulder which defines a rear support surface for the bearing 20. The bearing 20 thus permits centring of the intermediate shaft 7 relative to the support element 16.

According to one embodiment, not represented, the front end of the intermediate shaft 7 is fitted in the crankshaft of the thermal engine via a control bearing which is fitted in a cavity in the nose of the crankshaft.

The bearing 20 comprises an outer ring, an inner ring and rolling bodies which extend between the said inner and outer rings. The outer ring is coupled axially with the support element 16, whereas the inner ring is coupled axially with the intermediate shaft 7. Thus, the bearing is secured axially relative to the support element 16 on the one hand, and to the intermediate shaft 7 on the other hand. In addition, fitting of this type of the bearing 20 makes it possible to retain the intermediate shaft 7 axially relative to the support element 16.

In order to couple the inner and outer rings axially, they can be forced in or glued. Alternatively, it is also possible to use one or more blocking units, such as resilient rods or circlips, not represented. For this purpose, the intermediate shaft 7 is equipped with a securing groove which extends at the front of the bearing 20. During an operation of securing of the bearing 20, a blocking unit such as a rod or circlip is arranged by means of resilient deformation in a securing position in the said securing groove, such as to limit the axial displacement of the bearing 20 forwards. Similarly, the support element 16 can have a securing groove which extends at the rear of the bearing 20, and can receive a blocking unit. The blocking unit is arranged by resilient deformation in the securing groove of the support element 16, and makes it possible to limit the axial displacement of the bearing 20 rearwards. According to an intermediate embodiment, one of the inner and outer rings is forced in or glued, whereas the other ring is retained axially by a blocking unit accommodated in a groove.

The support element 16 is for example made of metal. It can in particular be made of mouldable material, and can for example be made of aluminium or an aluminium-based alloy. It is preferably made of non-magnetic material.

Figure 13:
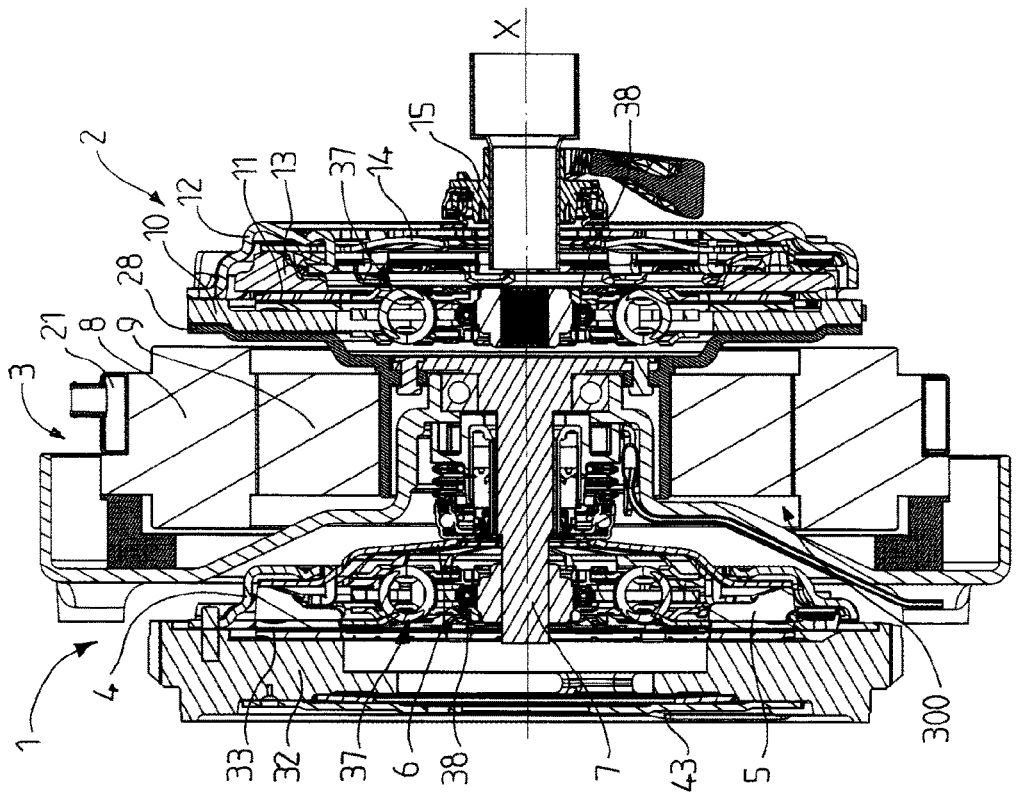
FIGS. 13, 14 and 15 are views in axial cross-section of a transmission assembly comprising two clutches and an electrical machine according to a second, a third and a fourth embodiment.
Figure 14:
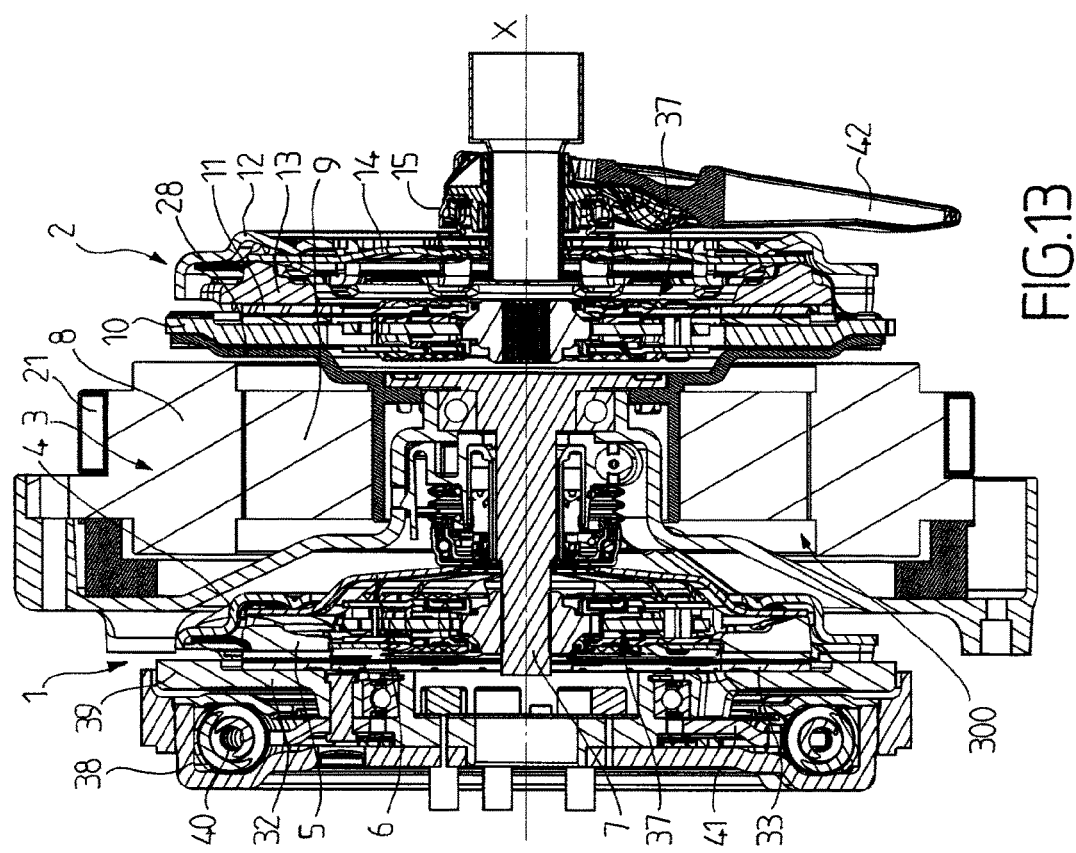
Figure 15:
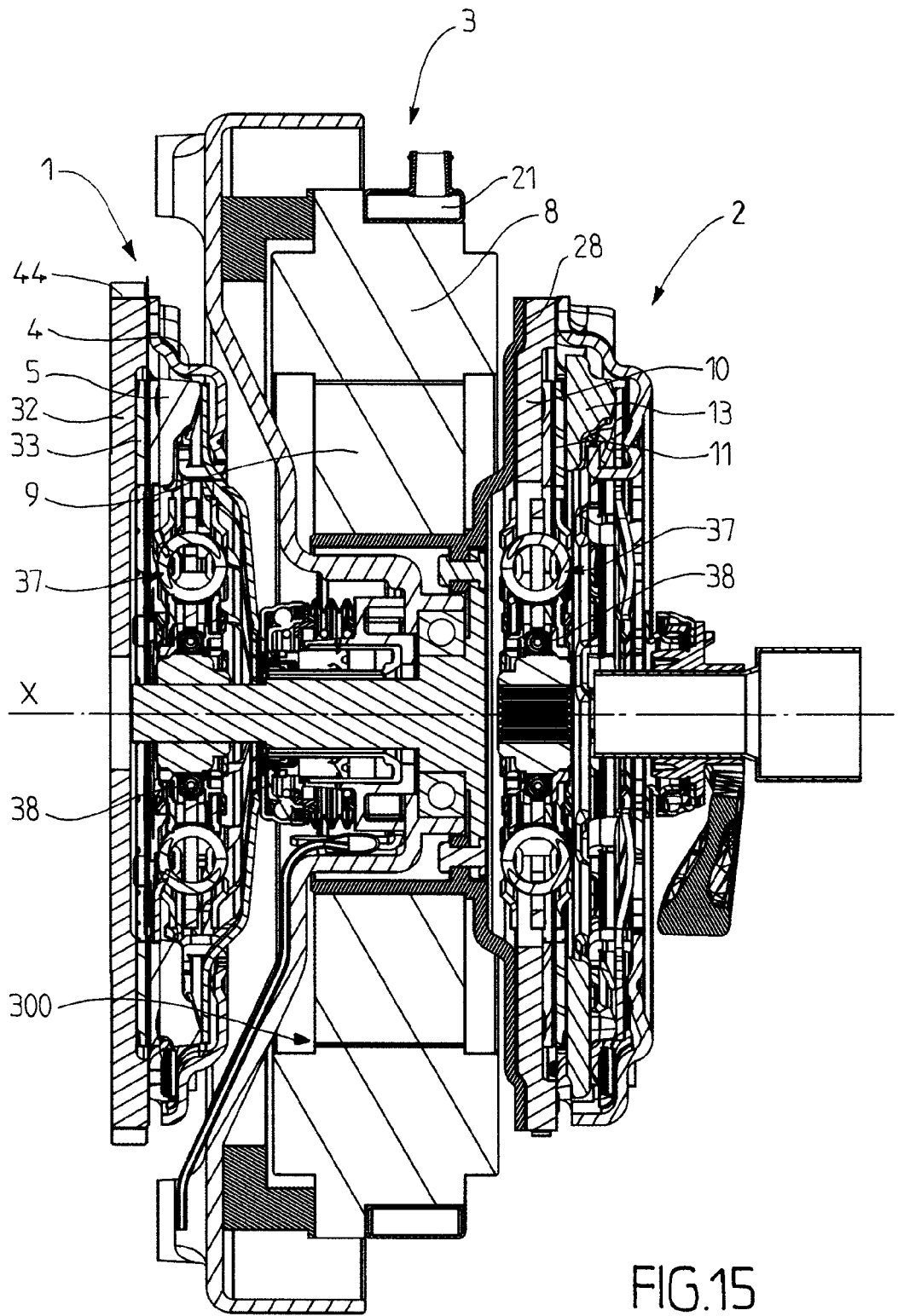

According to one embodiment, the support element 16 has a cooling circuit 21 in order to cool the stator 9. For this purpose, it is possible to produce an annular form in the outer peripheral wall 18 by moulding in sand. This cooling circuit 21 has an input and an output which permit circulation of a cooling fluid. Alternatively, as illustrated in FIGS. 13, 14 and 15, it is also possible to obtain a cooling circuit of this type by means of an added-on tube.

The rotor 9 is supported by a hub 22. The hub 22 comprises an axial skirt 26 for support of the rotor 9. On its outer surface, the axial skirt 26 comprises a radial shoulder 27 which defines a support surface for the rotor 9. The rotor 9 comprises a set of plates. It is fitted by sintering on the outer surface of the axial skirt 26. Thus, the set of plates is fitted by being forced hot onto the outer surface of the axial skirt 26, until contact with the radial shoulder 27 takes place. According to another embodiment, the rotor 9 can be forced onto the outer surface of the axial skirt 26.

The hub 22 additionally comprises an annular radial ring 28, which extends at the rear of the stator 8 and the rotor 9, and bears the reaction plate 10 of the clutch 2 on the gearbox side. The reaction plate 10 is secured on the annular radial ring 28 outside the annular area of friction of the reaction plate 10, which is designed to co-operate with the friction linings of the friction disc 11 in the engaged position. In this case, the reaction plate 10 is secured on the annular radial ring 28, in an outer peripheral area which extends radially beyond the friction area.

The reaction plate 10 is secured at an axial distance from the electrical machine 3. A space is thus provided between the reaction plate 10 and the electrical machine 3.

The axial skirt 26 has an axial portion 29 which extends between the radial shoulder 27 for support of the rotor and the annular radial ring 28, such as to define a gap between the annular ring 28 and the rotor 9. In other words, the area of connection of the annular ring 28 on the axial skirt 26 is offset axially relative to the rotor 9, so as to avoid magnetic leakages.

The annular ring 28 comprises a cambered portion 30 which extends between two annular flat portions. This cambered portion 30 makes it possible in particular to provide the annular ring 28 with flexibility, thus making it possible to uncouple the rotor 9 in flexure from the reaction plate 10.

The hub 22 for support of the rotor 8 is secured on the intermediate shaft 7. For this purpose, the rear end of the intermediate shaft 7 comprises a collar 23 which is supported axially against an inner flange 25 which is formed in the support hub 22, and extends radially towards the interior of the axial skirt 26. Rivets 24 make it possible to secure the collar 23 of the intermediate shaft 7 and the inner flange 25 of the hub 22. Thus, the rotor 9 is centred relative to the support element 16 and consequently relative to the stator 8, by means of the bearing 20.

The hub 22 is made of steel plate or iron. Making the said hub 22 of plate makes it possible firstly to facilitate the sintering of the rotor 9 on the hub 22, and secondly to limit the conduction of the calories produced by friction by the clutch 2, towards the rotor 9.

In order to limit the conduction of the calories generated by the friction of the clutch 2, it is also possible to provide an additional layer of material with low thermal conductivity arranged at the interface between the annular radial ring 28 and the reaction plate 10. The additional layer can be a plastic layer based on polyphenylene sulphide or polyamide 6-6, for example, or a sheet of paper of the "DMD" type consisting of a polyester film and an impregnated non-woven covering which covers each of the surfaces of the polyester film.

With reference to FIGS. 2 to 10, a detailed description will now be given of a clutch stop 100 for actuation of the clutch 1 on the engine side, as well as its assembly in the interior of the receptacle 201 in the support element 16.

The clutch stop 100 is a stop controlled by fluid. This fluid can be hydraulic fluid or pneumatic fluid. The control fluid is usually oil. According to one embodiment, the stop can also be an electrically controlled stop.

The stop 100 is concentric relative to the axis X, and the intermediate shaft 7 passes through it. The stop 100 comprises two parts in a cylinder-piston relationship, i.e. a fixed part 160, which delimits a blind annular cavity with axial orientation, and a piston 162 which is fitted such as to be mobile axially relative to the fixed part 160. The piston 162 penetrates in the cavity, in order to define together with the latter a work chamber 161 with a variable volume. The cavity communicates by means of a channel with a connection inlet for a fluid supply tube which is connected to a master cylinder. The master cylinder is activated by an actuator with an electric motor or a pressure/volume generator which is controlled according to programmes predetermined by a computer. The work chamber 161 can thus be pressurised or depressurised.

In the embodiment represented, the fixed part 160 of the stop 100 comprises a guide tube 167 and an outer body 101 which surrounds the guide tube 167. The guide tube 167 is for example made of metal, and defines the annular cavity in which the piston 162 is mobile, and thus guides the piston 162. The guide tube 167 is assembled on the body 101. The intermediate shaft 7 passes through the guide tube 167.

Alternatively, the fixed part 160 can be in a single piece made of mouldable material, for example plastic material, with the body 101 then defining the annular cavity in which the piston 162 is mobile.

The clutch stop 100 is in this case of the self-centring type. It comprises a ball bearing 163 with a rotary ring 164 which is profiled for intermittent contact with the inner ends of the fingers 165 of the diaphragm 6, and a non-rotary ring 166, which is coupled axially with the piston 162. For further details on the self-centring of the stop, reference will be made for example to document FR-A-2619880. Sealing bellows 169 extend between the body 101 and the non-rotary ring 166. As a variant, the stop is of the drawn type, with the stop 100 then acting by drawing on the fingers of the diaphragm.

According to one embodiment, the clutch stop 100 is equipped with a position sensor which makes it possible to control the position of the piston 162 relative to the body 101. The position sensor can be a sensor which is integrated in the piston, or it can be installed in the actuator for control of the clutch stop 100.

Figure 3:
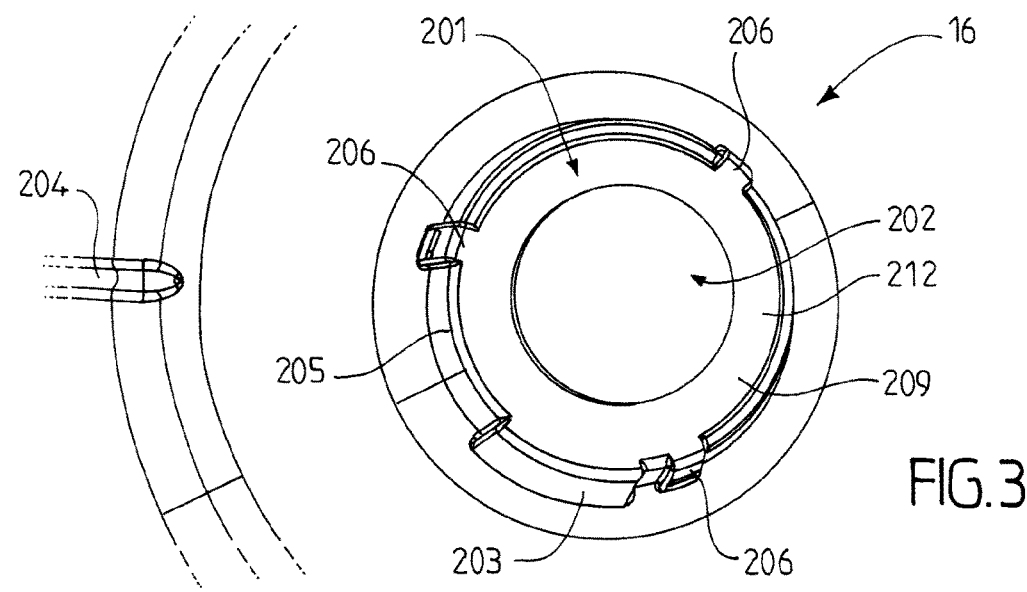
FIG. 3 is a partial view in perspective on the engine side of a stator support element of an electrical machine with a receptacle in order to receive a clutch stop.
Figures 4, 5:
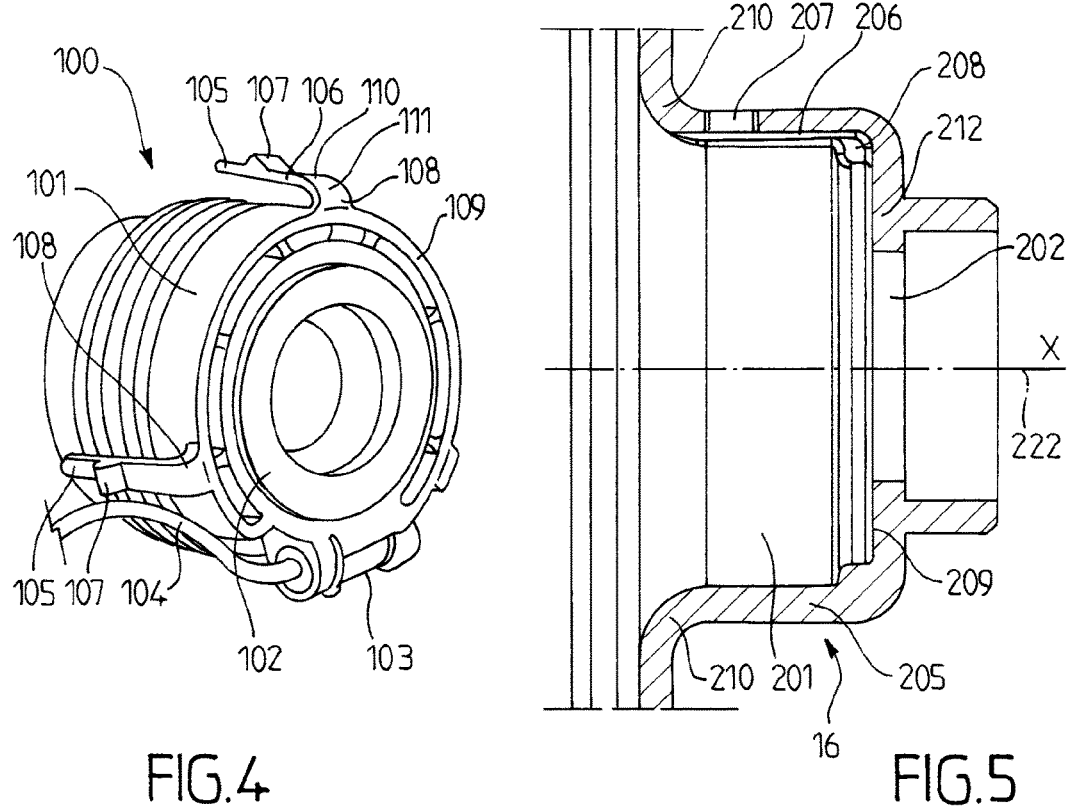
FIG. 4 is a view in perspective of a clutch stop.
FIG. 5 is a view in axial cross-section of the receptacle of the stator support element in FIG. 3.

With reference to FIGS. 3 to 5, a description will now be provided of the receptacle 201 of the support element 16 which is designed to receive at least partially the clutch stop 100 of the clutch 1 on the engine side.

As previously stated, the receptacle 201 is defined by a base 212 and an axial skirt 205. The base 212 is pierced by a bore 202 which permits the passage of the intermediate shaft 7. The axis of the bore 202 is coaxial with the axis X of rotation of the assembly.

The axial skirt 205 comprises a recess 203 to permit the passage of a joining piece 103 for connection to a tube to supply fluid for control of the stop 100. In addition, the inner ring 19 of the support element 16 comprises a recess 204 for the passage of the tube for supply of fluid to the clutch stop 100. The recess 204 which is provided for the passage of the control tube is slightly oversized relative to the diameter of the supply tube.

In order to facilitate the putting into place of the clutch stop 100, the axial skirt 205 comprises guide slots 206 which are designed to co-operate with resilient locking lugs 106 described hereinafter. The guide slots 206 are parallel to a generatrix of the axial skirt 205.

According to one embodiment, the guide slots 206 are also used as polarising slots which make it possible to permit only a singular angular position for fitting of the clutch stop 100 in the receptacle 201. Thus, the guide slots 206 make it possible to position the clutch stop 100 angularly relative to the receptacle 201, such as to position the connection joining piece 103 of the clutch stop 100 in relation to its respective recess 203. In order to obtain this result, the angular distribution of the slots 206 is irregular. In other words, there are at least two different angular distances between two adjacent slots 206.

In order to facilitate the insertion of the resilient locking lugs 106 in the receptacle 201, the front end of the longitudinal edges of the slots 206 can comprise chamfers which make it possible to adjust a positioning difference of a few degrees during the insertion of the resilient locking lugs 106 in the slots 206. Similarly, the slots 206 have a width and/or a depth which is greater at their front end than at their rear end, in order to facilitate the insertion of the resilient locking lugs 106. In an arrangement of this type, the variations of the gradient of the longitudinal edges or of the radially outer edge can be linear or non-linear.

The axial skirt 205 also comprises cavities 207 which make it possible to accommodate a protuberance 107 supported by a resilient locking lug 106. In this case, the cavities 207 extend in the base of the guide slots 206.

In order to retain the clutch stop 100 angularly and prevent any rotation of the clutch stop 100 relative to the receptacle 201 caused by the drag torque of the stop bearing, the receptacle 201 is provided in the vicinity of its base with tangential stops 208 which are designed to co-operate with the resilient locking lugs 106. In this embodiment, the stop surfaces of the tangential stops 208 which border each slot are parallel in pairs, and symmetrical relative to a median plane which passes via the axis X.

At the input of the axial skirt, the ridge which is formed between the axial skirt 205 and the inner ring 19 is broken by a fillet 210. According to another embodiment, the ridge is broken by a chamfer. These arrangements make it possible to facilitate the insertion of the clutch stop 100 in the interior of the receptacle 202.

Finally, the base 212 of the receptacle 201 comprises a support surface 209 which permits the axial support of the clutch stop 100.

FIG. 4 is a view in perspective of an embodiment of a clutch stop 100, illustrating means for securing of the clutch stop 100 in the receptacle 201.

The body 101 or case is provided with resilient locking lugs 106. A resilient lug 106 comprises a proximal end for connection to the body 101 and a free distal end. The resilient lug 106 is in the form of an "L" and comprises a portion 108 with radial orientation which extends from its proximal end, and a portion 110 with axial orientation. The proximal end for connection to the body 101 is situated in the vicinity of the rear end of the body 101, and the portion 110 with axial orientation extends towards the front, i.e. in a direction opposite the base 212 of the receptacle 201. The resilient lug 106 is provided with a protuberance 107 which can co-operate with a respective locking cavity 207. The protuberance 107 extends radially towards the exterior, from the portion 110 with axial orientation.

The resilient lug 106 thus constituted has a radial flexure capacity around the junction between the portion 108 with radial orientation and the portion 110 with axial orientation. This radial flexibility of the resilient lug 106 allows the protuberance 107 to be displaced radially. Thus, during the assembly of the clutch stop 100 on the support element 16, the resilient lug 106 is deformed radially towards the interior by contact of the protuberance 107 with the axial skirt 205, and is then returned towards the exterior, towards a locking position, when the protuberance 107 is accommodated in its respective cavity 207.

It should be noted that the body 101 is advantageously made of a material which is suitable for providing the resilient lugs 106 with a sufficient resilient deformation capacity. By way of example, the body 101 can in particular be made of plastic material, such as polyamide 6-6 optionally completed by fillers.

In addition, the resilient lugs 106 are designed to allow an operator to unlock the fastening of the clutch stop 100, in order to extract it from its receptacle 201, during a maintenance operation for example. For this purpose, the protuberance 107 extends on a median portion of the resilient lug 106. Thus, a support radially towards the interior on the free distal end of the resilient lug 106 displaces the protuberance 107 from its locked position, in which it extends in the interior of the locking cavity 207, towards a released position in which it extends radially outside the cavity 207. In other words, the distal portion of the resilient lug 106 which extends beyond the protuberance 107 constitutes an unlocking tongue 105 which allows an operator to act on the radial clearance of the lug 106. Thus, this operator can unlock the clutch stop 100 easily, in order to be able to extract it from its receptacle 201.

In the embodiment represented, the protuberance 107 is in the form of a tooth. The rear surface 117 is inclined, such as to facilitate the insertion of the clutch stop 100 in the receptacle 202. The inclination relative to the axis X is preferably less than 45°. The front surface 127, on the distal end side, also has inclination, the function of which will be described in FIG. 9. The inclination of the front surface 127 relative to the axis X is preferably greater than 45°.

Finally, the body 101 comprises a connection joining piece 103, in order to permit connection to a fluid supply for control of the clutch stop 100. In this embodiment, the control is obtained by means of a pneumatic or hydraulic fluid conveyed by piping, in this case a flexible or rigid supply tube 104.

The body 101 comprises a shoulder 109, in order to ensure the axial support of the clutch stop 100 against the base 212 of the receptacle 201. The body 101 also comprises a cylindrical step 102, which co-operates with the bore 202 formed in the base 212 of the receptacle 201. This step is used to position the clutch stop 100 on the support element 16. In order to guarantee this centring, this cylindrical step 102 is coaxial with the reference axis X.

Figure 6:
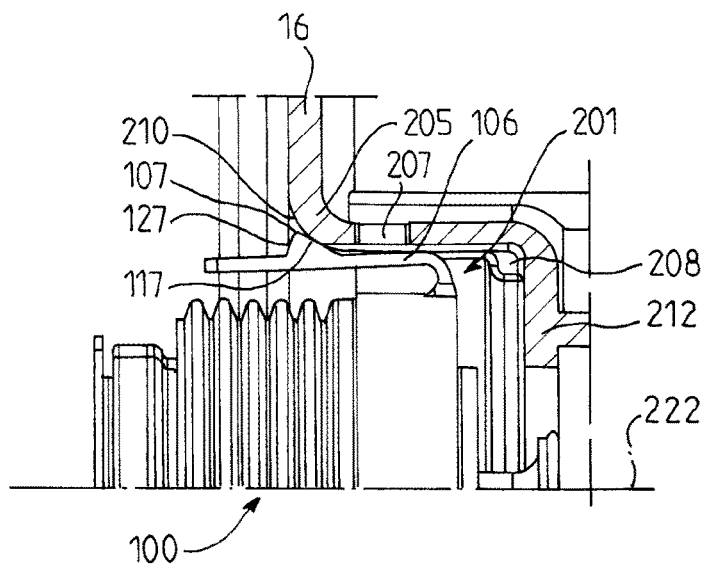
FIGS. 6 to 8 are views in axial cross-section showing the successive steps of fitting of the clutch stop in the stator support element in FIG. 3.
Figure 7:
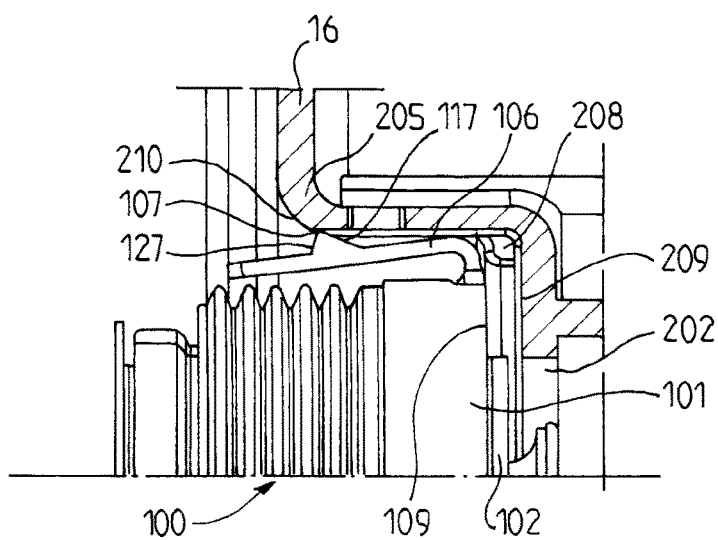
Figure 8:
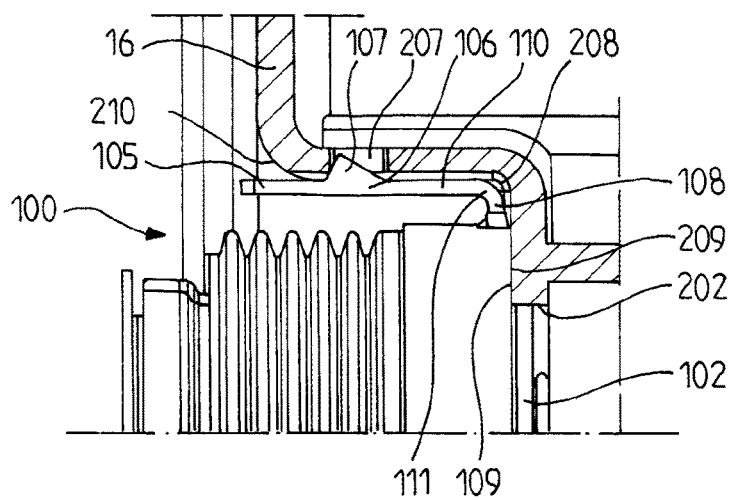

FIGS. 6 to 8 represent the three steps of fitting of the clutch stop 100.

In a first step, the clutch stop 100 is placed facing the receptacle 201, complying with the polarisation provided by the resilient lugs 106 and slots 206. When the protuberance 107 comes into contact with the support element 16, the fillet 210 at the input of the receptacle 202 is supported on the front surface 117 of the protuberance. The inclination of the front surface 117 of the protuberance 107, combined with the form of the fillet 210, makes it possible to deform the resilient lug 106 progressively, in order to fold the distal end back towards the central axis of the stop 100, and assist the insertion of the latter. The form of the input of the receptacle, as well as the inclination of the front surface 117 of the protuberance 107, thus contribute towards facilitating the insertion, without needing pressure by the operator on the resilient lugs 106.

In a second stage, the clutch stop 100 is thrust according to the reference axis X, as far as the base of the receptacle 201, such that the cylindrical step 102 penetrates in the bore 202, and the shoulder 109 is then supported on the support surface 209. In order to facilitate the insertion of the cylindrical step 102 in the bore 202, the cylindrical step and the bore 202 comprise complementary conical chamfers.

During this insertion phase, the lug 106 remains in the radially bent position, under the force exerted by the base of the slot 206 in the axial skirt 205.

During the final step, when the clutch stop 100 has reached its raised position abutting the base 212 of the receptacle, the protuberance 107 is facing the cavity 207. Thanks to its resilience, the lug 106 regains its form of rest, and the protuberance 107 penetrates in the cavity 207, thus ensuring axial immobilisation of the clutch stop 100. In other words, the locking lug 106 is used to clip the clutch stop 100 into the receptacle 201 in the support element 16.

In this position, the portion with radial orientation 108 is supported against the tangential stop 208, in order to retain the clutch stop 100 angularly. The tangential stop 208 makes it possible to prevent the angular retention from taking place between the protuberance 107 and its cavity 207, since, taking into account the positioning of the protuberance 107, a tangential force exerted at the level of the protuberance would generate a lever arm effect, and therefore torsion at the level of the base of the resilient lugs 106, of a type such as to break them.

In the raised position, the distal end of the resilient lugs 106 extends axially from the axial skirt 205. An arrangement of this type facilitates the unlocking manoeuvres. As a variant, the resilient lug 106 is shorter, and does not project from the receptacle 201. This arrangement is used in particular in the case of a problem with size.

Figure 9:
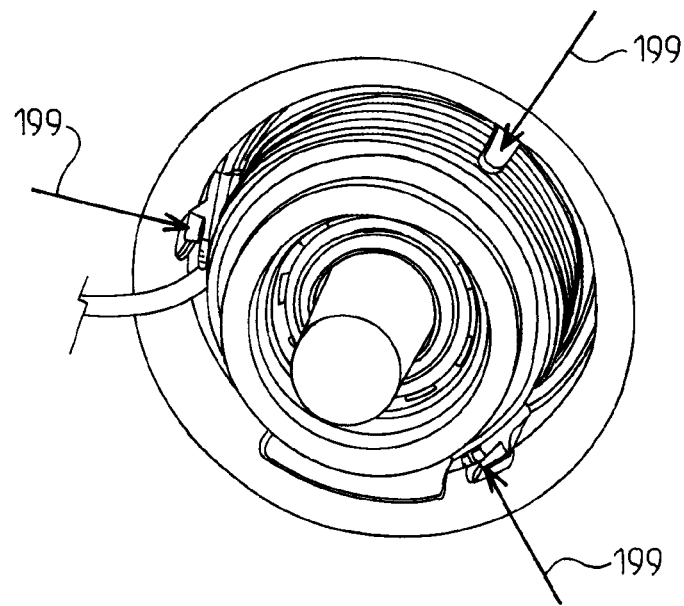
FIG. 9 is a view in perspective, showing the locking lugs in a position bent radially towards the interior, in which the protuberances are in the released position, and extend outside their respective locking cavities.

In order to dismantle the clutch stop 100, with reference to FIG. 9, it is necessary to exert a radial force 199 on the distal end which forms a tongue 105 of the resilient lugs 106, from the exterior of the stop 100 towards its central axis, such as to displace the protuberances 107 towards their released position in which they extend from their cavity 207. The front surface 127 of the protuberance 107 has inclination which facilitates the unlocking when a radial force 199 is exerted. When the stop is no longer immobilised in its receptacle 201 by the protuberances 107, it is sufficient to extract it by pulling it towards the front of the axial skirt 205.

Figure 10:
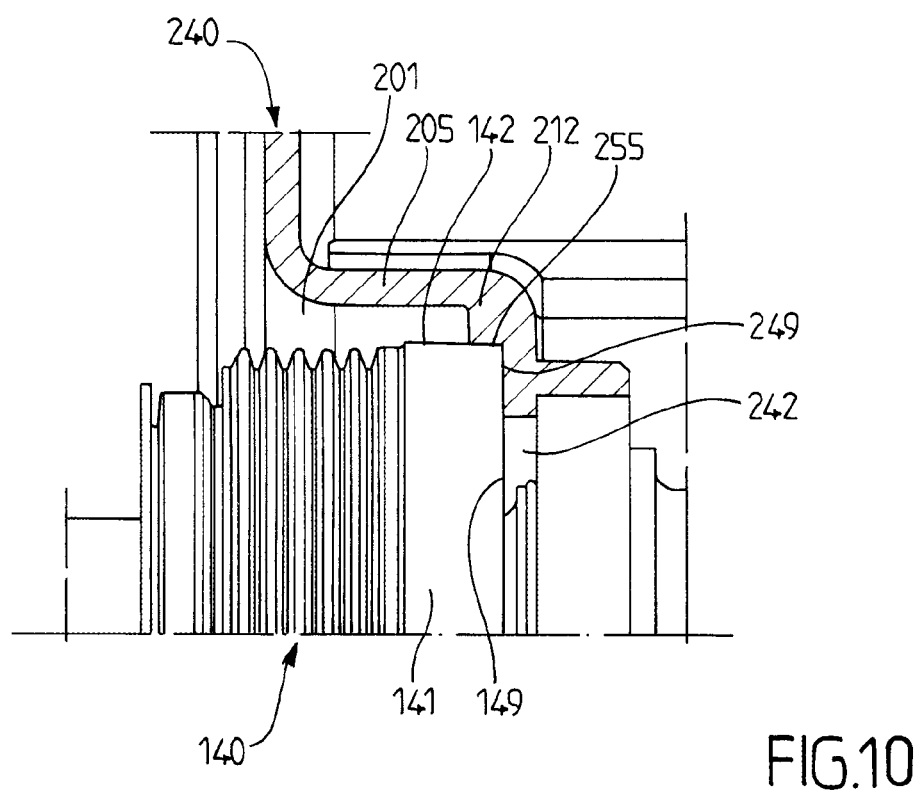
FIG. 10 is a view in cross-section of a clutch stop and a stator support element according to another embodiment.

FIG. 10 represents another embodiment of the centring and support function of the body 101 relative to the receptacle 201. In FIG. 9, elements which are identical to those in FIGS. 3 to 9 bear the same reference number. Modified analogous elements bear the same reference number increased by 40.

In this embodiment, the base 212 of the receptacle 201 comprises a shoulder which forms a centring bore 255 and a radial surface 249 for axial support of the body 141 of the stop 100. The outer envelope 142 of the body 141 of the clutch stop 140 is cylindrical, in order to ensure the centring function with the bore 255 which is present at the base 212 of the receptacle 201. As in the embodiment previously described, the cylindrical envelope 142 and the bore 255 are coaxial with the axis X of the assembly. In order to provide the axial stop, the body 141 comprises at its rear end a support surface 149 which abuts the base of the bore 249.

Figure 11:
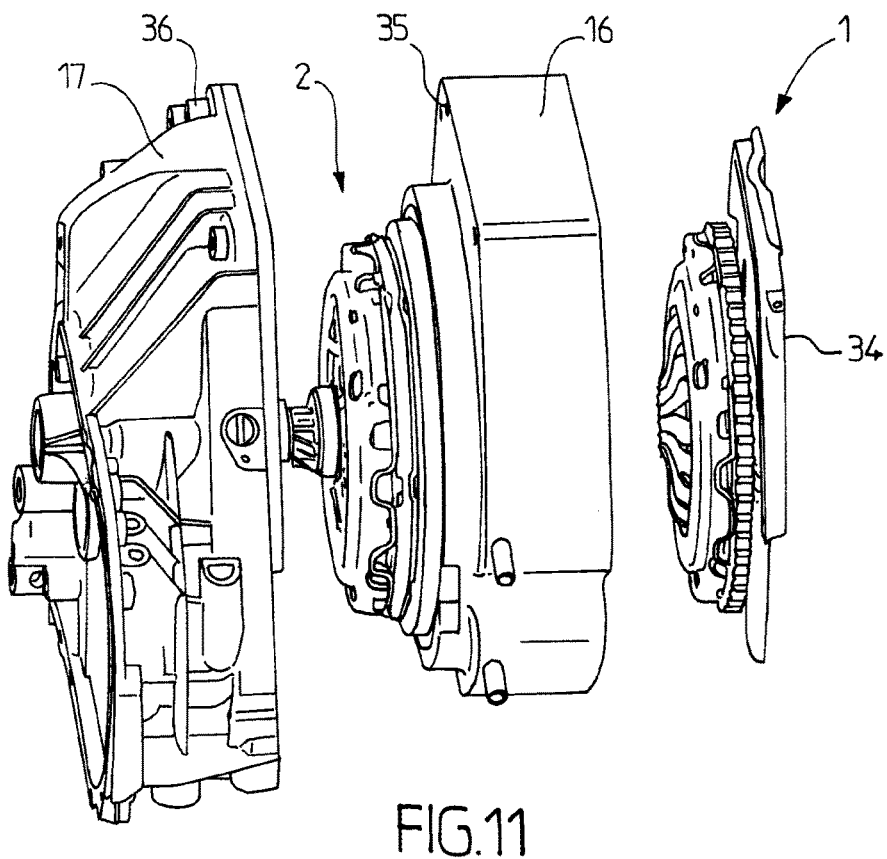
FIG. 11 is a view in perspective illustrating a clutch secured on the engine block and a pre-fitted module which can form a transmission assembly according to FIG. 1.
Figure 12:
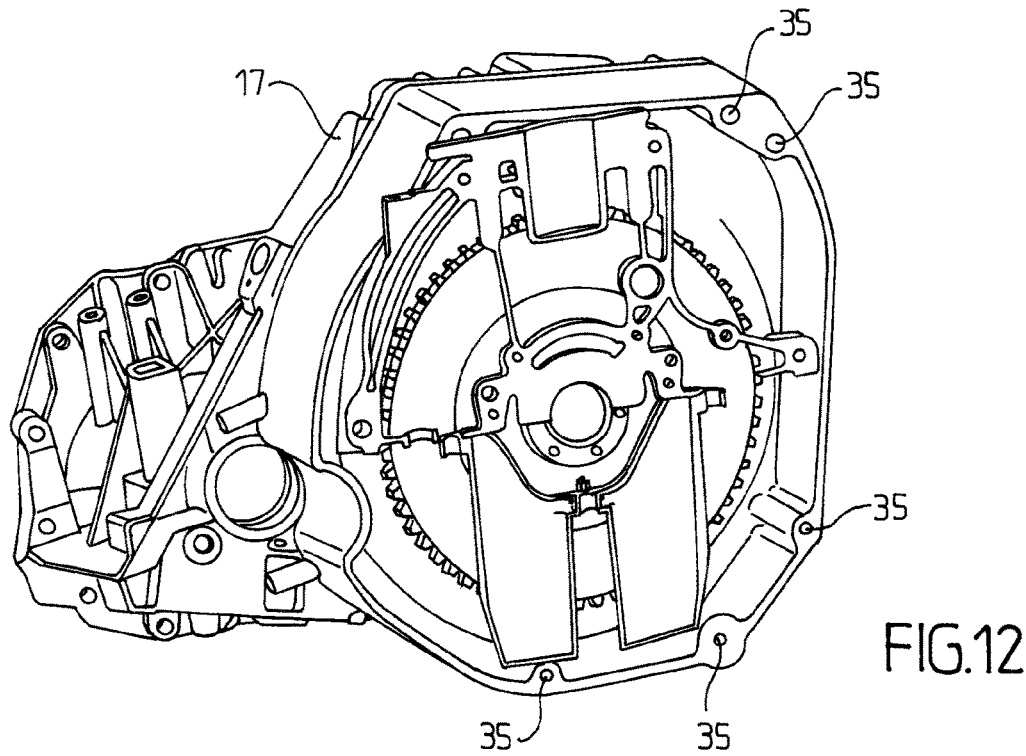
FIG. 12 is a view in perspective of the engine side of the transmission assembly in FIG. 1.

FIGS. 11 and 12 illustrate the method for assembling a transmission assembly.

The clutch 1 on the engine side is secured on the engine block 34. For this purpose, the engine flywheel which bears the reaction plate 32 is secured on the crankshaft of the combustion engine by means of screws, then the mechanism, as well as the friction disc 33 of the clutch 1 on the engine side are fitted on the engine flywheel. Alternatively, it is also possible to pre-assemble a module comprising an engine flywheel, a clutch mechanism and a friction disc 33, then to fit the said module on the crankshaft of the combustion engine.

In addition, a module comprising at least one support element 16, the clutch stop 100 for actuation of the clutch 1 on the engine side, the intermediate shaft 7, an electrical machine 3 and the clutch reaction plate 2 on the gearbox side, is pre-assembled. The pre-assembly of a module of this type makes it possible to facilitate the fitting of the assembly during assembly of the transmission with the engine block.

In the embodiment represented, the pre-assembled module additionally comprises the mechanism, i.e. the cover 12, the pressure plate 13 and the diaphragm 14, as well as the friction disc 11 of the clutch 2 on the gearbox side.

This pre-assembled module is easy to handle and transport, with the elements of the said module being secured axially and centred relative to one another, in particular by means of the bearing 20.

The support element 16 comprises securing orifices 35 which pass through the said support element 16 from one side to the other. These securing orifices 35 open opposite orifices 36 which are formed in the housing 17 of the gearbox, and opposite orifices, not represented, which are formed in the engine block or in a brace for connection to the engine block. Thus, securing screws, not represented, are inserted through the said orifices 35, 36, such as to render the gearbox, the pre-assembled module and the engine block integral.

According to one embodiment, the pre-assembled module is pre-positioned on the engine block by means of pins or centring sleeves for example, then the housing 17 of the gearbox is added on against the support element 16, and the screws are inserted through the orifices 36 in the housing, the orifices 35 in the support element 16, and the orifices in the engine block, in order to render the assembly integral.

According to an alternative embodiment, it is also possible to pre-position the pre-assembled module on the housing 17 of the gearbox, then to add the gearbox and the pre-assembled module onto the engine block.

According to another embodiment, a first set of securing orifices 35 can be used for the passage of screws which are designed for securing of the pre-assembled module on the gearbox, whereas a second set of securing orifices 35 can be used for the passage of screws which are designed for securing of the pre-assembled module on the engine block 34.

According to one embodiment, it is also possible to use studs with two threaded ends, in order to allow the pre-assembled module to be fitted on the housing 17 of the gearbox via the first end of the said studs, and on the engine block 34 via the second end of the said studs.

As represented in FIGS. 13, 14 and 15, the friction discs 11, 33 are advantageously equipped with torsion dampers 37. Typically, a torsion damper 37 of this type comprises two guide washers which are integral in rotation with a disc for support of the friction linings, and form the input element of the damper. The guide washers are arranged on both sides of a ring which forms the output element of the damper. Resilient units with circumferential action, such as helical springs, are fitted in receipt windows provided opposite, in the guide washers and in the ring. The ends of the helical springs are supported against the radial edges of the receipt windows, such that the said helical springs can transmit torque between the guide washers and the ring.

The friction washers 11, 33 can also be equipped with a pre-damper 38, which is designed to filter the vibrations generated by the acyclisms of the combustion engine when it is idling. Pre-dampers of this type, represented in particular in FIGS. 14 and 15, have small-sized helical springs, with lower rigidity than those of the springs of a main damper.

In the embodiment represented in FIG. 13, the reaction plate 32 of the clutch 1 on the engine side constitutes the secondary mass 39 of a double damping flywheel. The double damping flywheel comprises a primary flywheel 38 and a secondary flywheel 39, which are coaxial and mobile in rotation relative to one another thanks to a bearing such as a ball bearing. The primary flywheel 38 is designed to be secured on the crankshaft of the thermal engine for example by means of screws. The primary flywheel 38 and the secondary flywheel 39 are coupled in rotation by means of damping means. The damping means are typically helical springs 40 which are arranged circumferentially in an annular chamber formed in the primary flywheel 38, and are filled with a lubrication agent. The helical springs 40 are supported at their ends on bosses on the lateral walls of the annular chamber, and on radial lugs on an annular ring 41 which is secured by rivets on the secondary flywheel 39.

In addition, FIG. 13 illustrates a clutch 42 which can pivot in order to displace the clutch stop 2 on the gearbox side.

In the embodiment in FIG. 14, the reaction plate 32 of the clutch 1 on the engine side is secured on a flexible annular plate 43, which is designed to be secured on the crankshaft of the thermal engine, via screws for example. A Belleville washer acts between the reaction plate 2 and the flexible plate 43. A flywheel of this type is commonly designated as the flexible flywheel, and makes it possible to damp the excitations of the crankshaft in the axial direction.

In the embodiment in FIG. 15, the reaction plate 32 of the clutch 1 on the engine side is supported by a rigid engine flywheel which is designed to be secured on the crankshaft of the engine.

It will be noted that in the embodiments in FIGS. 1 and 15, the engine flywheel has on its outer periphery a toothed crown 44 which is designed to co-operate by engagement with the pinion of a starter. A starter of this type can be used in a manner complementary to the electrical machine 3, in order to start the thermal combustion engine, particularly in very cold weather, as described in document FR2 797 472, to which reference will be made for further information on this subject.

Figure 16:
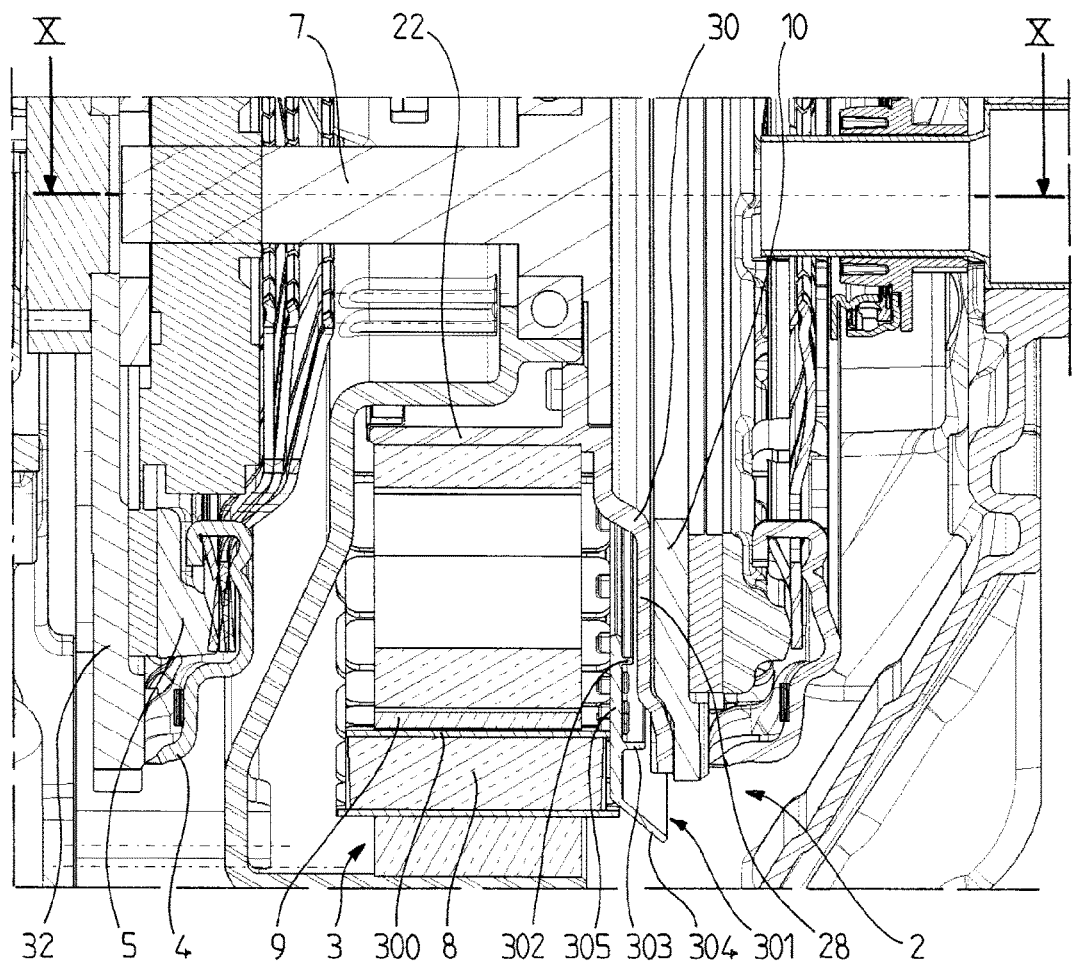
FIG. 16 is a partial view in axial cross-section of a transmission assembly comprising two clutches and an electrical machine, equipped with an anti-dust flange arranged between the electrical machine and the clutch on the gearbox side.
Figure 17:
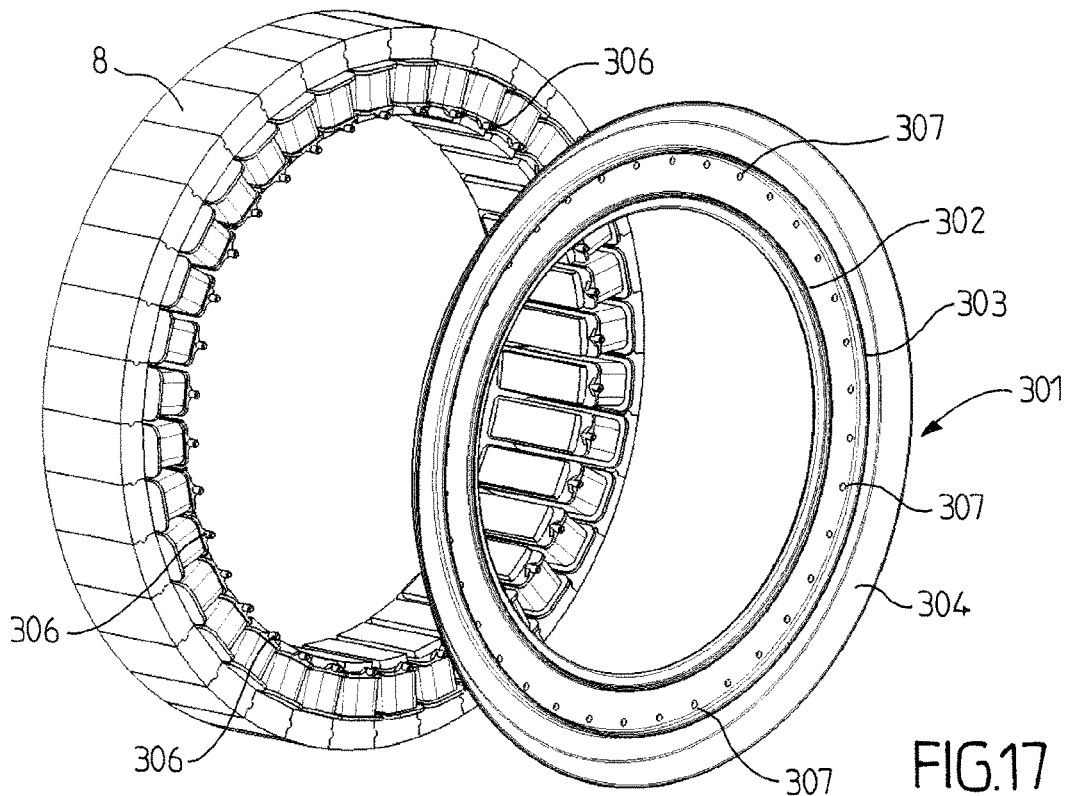
FIG. 17 is an exploded view in perspective of the stator and the anti-dust flange of the electrical machine in FIG. 16.

As previously stated, the reaction plate 10 is axially distant from the elements of the electrical machine 3, thus creating an axial space between the reaction plate 10 and the electrical machine 3. With reference to FIGS. 16 and 17, a description will now be provided of an anti-dust flange 301 which is designed to protect the electrical machine against particles of dust, which are derived in particular from the clutch 2 and can be introduced via the aforementioned axial space. These particles are generated in particular during the rubbing of the friction linings of the friction disc 11 between the reaction 10 and pressure 13 plates.

This flange 301 is designed to prevent the dust from accessing the annular air gap space 300 between the rotor 9 and the stator 8. In fact, if particles of this type were to penetrate in the annular air gap space 300, they could damage the rotor 9 and the stator 8 by abrasion, by acting as abrasive grains between the stator 8 which is a fixed part, and the rotor 9 which is a moving part.

In order to prevent this, the flange 301 is arranged in the space between the electrical machine 3 and the reaction plate 10, and more particularly between the reaction plate 10 on the one hand, and the rotor 9 and stator 8 assembly on the other hand. The flange 301 is in the form of a washer, the outer and inner periphery of which are defined by two concentric circles.

The flange 301 is secured on the stator 8. Its inner periphery extends radially towards the interior, beyond the annular air gap space 300, such as to cover it. The flange 301 comprises a cheek with radial orientation and two lips 302 and 303 which extend axially in the direction of the reaction plate 10. The lips 302 and 303 obstruct the passage of the dust into the space between the electrical machine 3 and the reaction plate 10. Advantageously, the axial distance between the end of the lips 302, 303 and the reaction plate 10, or the annular radial ring 28 which supports the reaction plate 10, when the annular radial ring 28 is arranged between the reaction plate 10 and the electrical machine 3, is limited to functional play, typically of less than 5 mm.

As shown in FIG. 16, the axial distance between the annular radial ring 28 and the electrical machine 3 is not constant. The gap or axial distance between the annular radial ring 28 and the stator 8 is greater than the gap between the annular radial ring 28 and the rotor 9. The inner lip 302 is arranged at the level of the rotor 9 in the smaller gap, whereas the outer lip 303 is positioned in the larger gap at the level of the stator 8. The axial dimension of this outer lip 303 is greater than the dimension of the smaller gap. According to this arrangement, the inner 302 and outer 303 lips are on both sides of the annular air gap space 300, and form baffles which obstruct further the passage of dust into the space between the reaction plate 10 and the electrical machine 3.

The flange 301 also comprises a deflector 304 which is arranged on the outer periphery of the cheek 305, and forms a frusto-conical rim which widens towards the exterior, in the direction of the clutch 2. This deflector makes it possible to confine the dust generated by the clutch 2 on the gearbox side, between the gearbox and the electrical machine 3.

Figure 18:
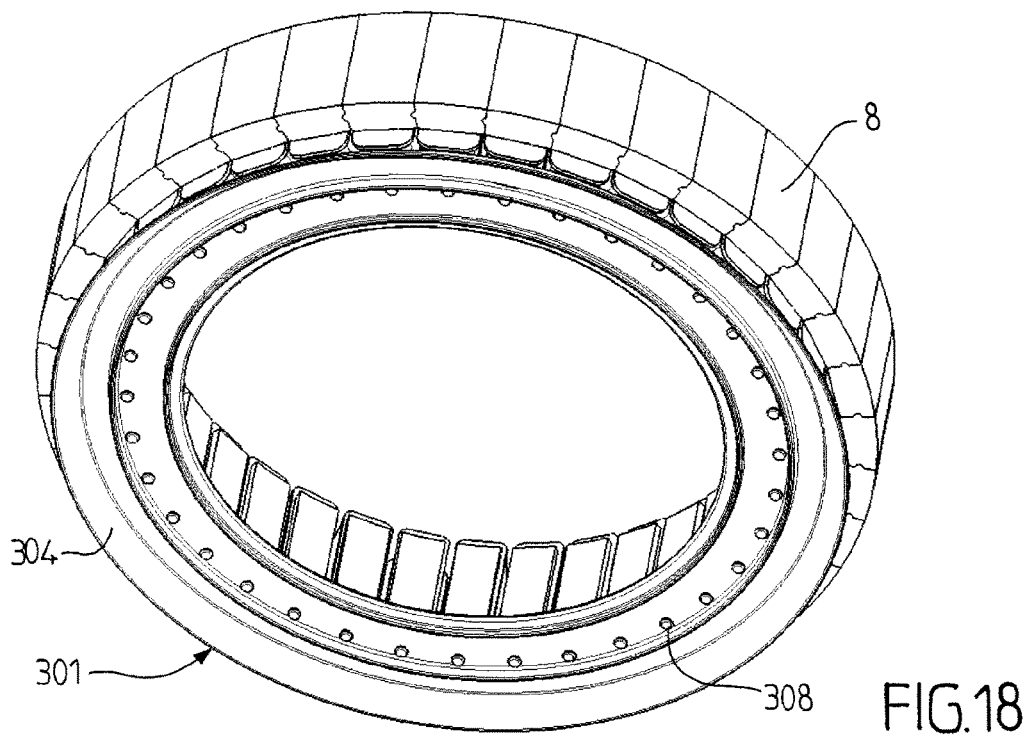
FIG. 18 is a view in perspective of the stator and the flange in FIG. 17 when they are assembled.

With reference to FIGS. 17 and 18, a description will now be provided of the securing of the flange 301 on the electrical machine 3, and more specifically on a fixed part of the electrical machine 3, i.e. the stator 8.

For this purpose, the stator 8 is provided with pins 306 which project axially from its lateral part on the gearbox side. The pins 306 are configured to co-operate with holes 307 which open out, and are provided in the flange 301. During the assembly step, the holes 307 and the pins 306 are used to position the flange 301 relative to the stator 8. Thus, the flange 301 is coaxial with the electrical machine 3.

According to one embodiment, the pins 306 are supported by the body of an interconnector which will be described hereinafter, which makes it possible to connect the coils of the stator 8.

The pins 306 are distributed regularly along the annular air gap space 300. After insertion of the flange 301 on the pins 306 of the stator 8, the pins 306 project from the flange 301 through the holes 307. The securing is obtained for example by assembly by means of ultrasound welding of the pins 306, such as to obtain at the end 308 of the pins a head, the dimensions of which are larger than the diameter of the hole 307. Thus, the flange 301 is retained blocked, in a non-removable manner, on the stator 8. In order to permit this assembly mode, the pins 306 are made of a heat-fusible material such as a thermoplastic. By way of example, the pins can be made in particular of polyamide 6-6.

According to one embodiment, the flange 301 is made of a non-magnetic material. By way of example, the flange 301 can be made in particular of plastic material. A flange of this type makes it possible to limit the magnetic leakages towards the reaction plate 10 or towards the annular radial ring 28 which supports the reaction plate 10 when the annular radial ring 28 is arranged between the reaction plate 10 and the electrical machine 3.

According to another embodiment, the flange 301 constitutes a magnetic shielding screen between the electrical machine 3 and the clutch 2 on the gearbox side, which can concentrate the lines of the magnetic field and limit the leakage field. For this purpose the flange 301 can in particular be made of plastic material associated with non-magnetic metal fillers, such as aluminium particles. A flange of this type advantageously has magnetic susceptibility of less than $1 \cdot 10^{-3}$.

Figure 19:
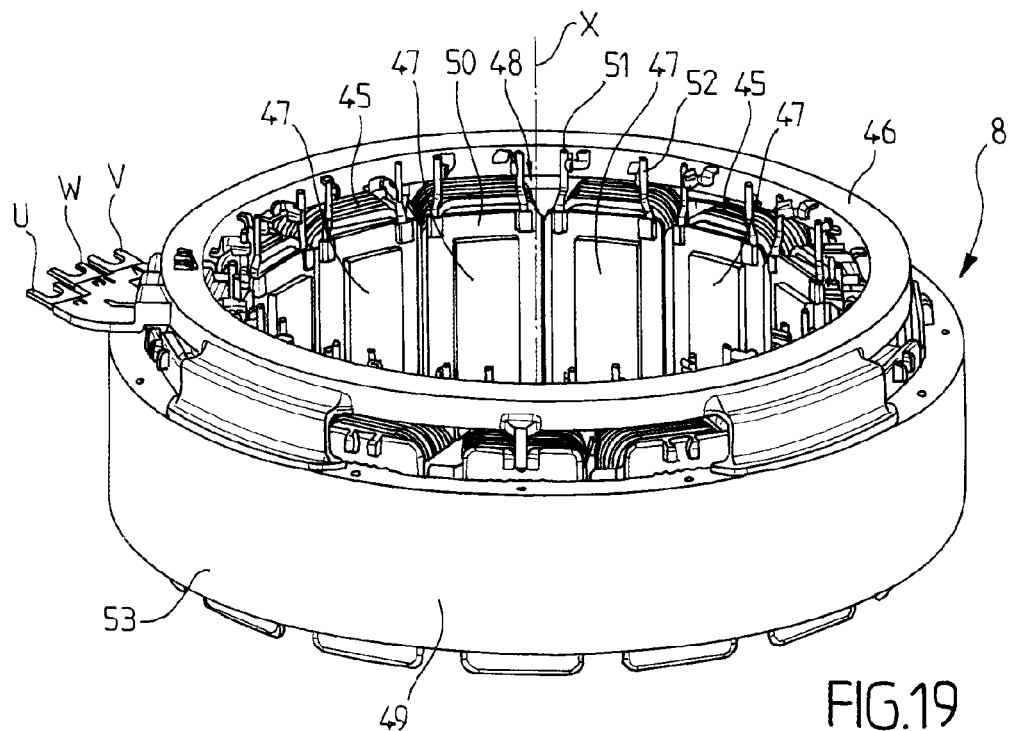
FIG. 19 is a view in perspective illustrating a stator of an electrical machine according to one embodiment.

FIG. 19 illustrates the stator 8 of an electrical machine 3 which can equip the transmission assembly. In this case, the stator belongs to a polyphase rotary electrical machine. The winding of the stator 8 is equipped with a plurality of concentric coils 45, which in this case are pre-formed, and a neutral point, known as the neutral of the machine, which can be seen for example in FIG. 1 of document EP 0 831 580. This stator is compact and high-performance from the point of view of the power of the electrical machine.

The coils 45 are interconnected to one another by means of a compact interconnector 46 comprising a plurality of frames, one of which, known as the neutral frame, is connected to the neutral of the rotary electrical machine. This stator 8 comprises a body with an annular form with an axis which is combined with the axis X. This body has teeth 47 which are distributed regularly around the inner periphery, as well as notches 48 which are open towards the interior, two consecutive notches 48 being separated by a tooth 47. These teeth 47 have edges which are parallel in pairs, with a strip of material, corresponding to the head 53, existing between the base of the notches 48 and the outer periphery of the body 49. The body 49 is formed by a stack of annular plates made of ferromagnetic material, coaxial to the axis X. The set of plates is retained by means of rivets (not represented) which pass axially from one side to the other of the set of plates. This stack makes it possible to reduce the Foucault currents.

The stator 8 comprises an interconnector 46 with connection terminals U, V and W for interconnection with a power connector.

Figure 20:
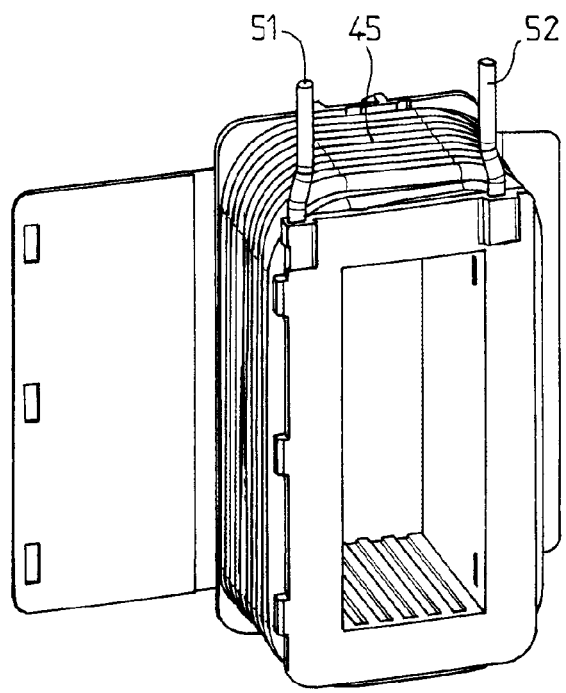
FIG. 20 is a view in perspective of one of the coils in FIG. 19.

As can be seen in FIG. 20, pre-formed coils 45 which form the winding of the stator 8 are fitted on the teeth 47 of the stator. These coils 45 are made from a wire wound around several turns. The wires consist of an electrically conductive wire, for example a copper and/or aluminium wire coated with an electrical insulator, such as enamel. The wires can have a cross-section which is circular or rectangular, or they can have a flattened form. The ends 51, 52 of each coil 50 extend axially from the winding on the same side of the stator 8, corresponding to the rear surface of the stator 8. Each coil 45 comprises a first end 51 known as the "input" which is designed to be connected to the other inputs alternately in order to belong to one of the phases, each having a terminal respectively U, V, W of the machine, and a second end 52 known as the "output" which is designed to be connected to the neutral of the electrical machine. For this purpose, the coils 45 are interconnected to one another by means of the interconnector 46.

In this embodiment, the interconnector 46 comprises four frames with an annular form which extend according to a radial plane. The frames are electrically conductive, and are for example made of copper or advantageously of another weldable metal material. These frames are stacked axially on one another and electrically insulated against one another. Each frame bears on its inner periphery apparent lugs which extend projecting radially towards the interior of the frame for welding of the ends 51, 52 of the coils of the stator. Preferably, the frames are embedded in a body made of electrically insulating material such as plastic material. Each phase frame comprises on its outer periphery a connection terminal U, V, W for interconnection with a power connector (not represented) which itself is connected to an inverter described for example in document EP 0 831 580. As a variant, the inverter is controlled by signals, as in document FR 2 745 444.

Figure 21:
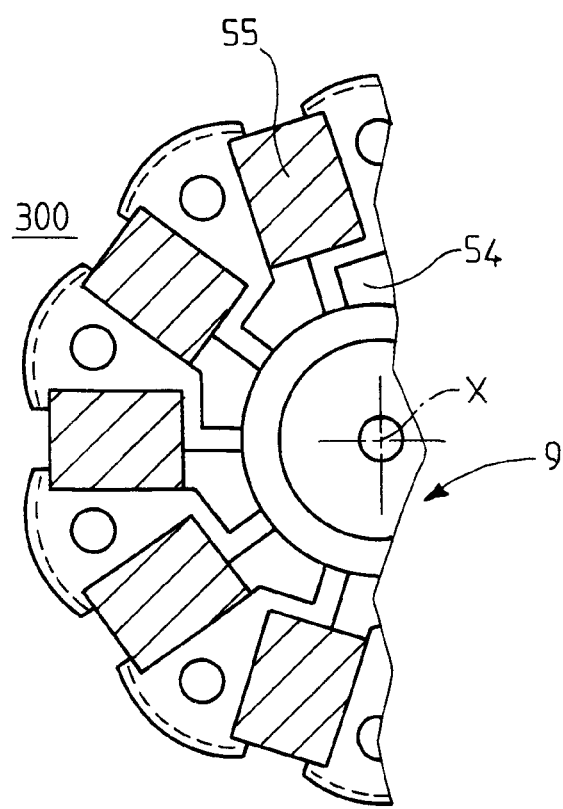
FIG. 21 is a partial front view of a rotor of an electrical machine according to one embodiment.

The electrical machine 3 is a synchronous machine. A rotor 9 with permanent magnets which is designed to equip the electrical machine is illustrated in FIG. 21. The rotor comprises a body formed by a set of plates 54 stacked according to the axial direction. The permanent magnets 55 are implanted radially in the plates 54 of the set of plates 54, on the outer periphery of the rotor 9. The permanent magnets 55 open out into the air gap 300. In this case, reference is made to a rotor with permanent magnets with open poles. A rotor of this type makes it possible to obtain a substantial useful magnetic flux.

According to one embodiment, the permanent magnets are magnets made of ferrite. A plurality of permanent magnets can be fitted in a single opening in the set of plates.

Although the invention has been described in association with a plurality of particular embodiments, it will be appreciated that it is in no way limited to these, and comprises all the technical equivalents of the means described, as well as their combinations, if these come within the scope of the invention.

The use of the verbs "contain", "comprise" or "include" and their conjugated forms does not exclude the presence of elements or steps other than those indicated in a claim. The use of the indefinite article "one" or "a" for an element or a step does not exclude the presence of a plurality of such elements or steps, unless otherwise stated.

In the claims, any reference number in brackets can not be interpreted as a limitation of the claim.

The invention claimed is:

1. A device for a transmission assembly of a motor vehicle, comprising:
  an electrical machine (3) comprising a rotor (9) rotatable around an axis X and a stator (8), the rotor (9) being arranged in an interior of the stator (8) and separated from the stator (8) by an annular air gap space (300);
  a clutch (2) coaxial with the electrical machine, the clutch comprising a reaction plate (10), the reaction plate (10) being integral in rotation with the rotor (9) and placed at an axial distance from the rotor (9) in order to provide a space between the electrical machine (3) and the reaction plate (10); and
  an anti-dust flange (301) arranged axially in the space between the electrical machine (3) and the reaction plate (10), and extending radially so as to cover the annular air gap space (300);
  a radial part of the anti-dust flange (301) forming a cheek (305);

the anti-dust flange (301) comprising a first axial lip (302, 303) extending axially from the cheek (305) in the direction to the reaction plate (10).

2. The device according to claim 1, wherein the anti-dust flange (301) is secured on the stator (8).

3. The device according to claim 2, wherein the anti-dust flange (301) comprises a conical deflector (304) on a radially outer periphery thereof, and wherein the conical deflector (304) widens radially outwardly in the direction to the clutch (2).

4. The device according to claim 1, wherein the anti-dust flange (301) comprises a second axial lip (302, 303) which extends from the cheek in the direction of the reaction plate (10).

5. The device according to claim 4, wherein the first and second axial lips (302, 303) are arranged radially on both sides of the annular air gap space (300).

6. The device according to claim 5, wherein the axial distance between the electrical machine (3) and the reaction plate (10) is not constant, wherein a gap between the reaction plate (10) and the stator (8) has an axial dimension greater than the axial dimension of a gap between the reaction plate (10) and the rotor (9), wherein the first axial lip (302) is arranged between the reaction plate (10) and the rotor (9), and wherein the second axial lip (303) is arranged between the reaction plate (10) and the stator (8), and has an axial dimension greater than the gap between the reaction plate (10) and the rotor (9).

7. The device according to claim 4, wherein the axial distance between the electrical machine (3) and the reaction plate (10) is not constant, with a gap between the reaction plate (10) and the stator (8) having an axial dimension greater than the axial dimension of a gap between the reaction plate (10) and the rotor (9), and wherein the first axial lip (302) is arranged between the reaction plate (10) and the rotor (9), and the second axial lip (303) is arranged between the reaction plate (10) and the stator (8), and has an axial dimension greater than the gap between the reaction plate (10) and the rotor (9).

8. The device according to claim 1, wherein the flange (301) is non-magnetic.

9. The device according to claim 1, wherein the anti-dust flange (301) is made of a material with magnetic susceptibility having a value of less than $1 \cdot 10^{-3}$ to magnetically shield the electrical machine (3).

10. The device according to claim 1, wherein the anti-dust flange (301) is made of plastic material comprising non-magnetic metal fillers to magnetically shield the electrical machine (3).

11. The device according to claim 1, wherein the anti-dust flange (301) comprises a conical deflector (304) on a radially outer periphery thereof, and wherein the conical deflector (304) widens radially outwardly in the direction to the clutch (2).

12. A device for a transmission assembly of a motor vehicle, comprising:
an electrical machine (3) comprising a rotor (9) rotatable around an axis X and a stator (8), the rotor (9) being arranged in an interior of the stator (8) and separated from the stator (8) by an annular air gap space (300);
a clutch (2) coaxial with the electrical machine, the clutch comprising a reaction plate (10), the reaction plate (10) being integral in rotation with the rotor (9) and placed at an axial distance from the rotor (9) in order to provide a space between the electrical machine (3) and the reaction plate (10); and
an anti-dust flange (301) arranged axially in the space between the electrical machine (3) and the reaction plate (10), and extending radially so as to cover the annular air gap space (300);
the anti-dust flange (301) comprising a conical deflector (304) on a radially outer periphery thereof, the conical deflector (304) widening radially outwardly in the direction of the clutch (2).

13. The device according to claim 12, wherein the radial part of the anti-dust flange (301) forms a cheek (305), and wherein the anti-dust flange (301) comprises a lip (302, 303) which extends axially from the cheek (305) in the direction to the reaction plate (10).

14. The device according to claim 12, wherein the anti-dust flange (301) is secured on the stator (8).

15. The device according to claim 12, wherein the anti-dust flange (301) is made of a material with magnetic susceptibility having a value of less than $1 \cdot 10^{-3}$ to magnetically shield the electrical machine (3).

16. The device according to claim 12, wherein the anti-dust flange (301) is made of plastic material comprising non-magnetic metal fillers to magnetically shield the electrical machine (3).

17. A device for a transmission assembly of a motor vehicle, comprising:
an electrical machine (3) comprising a rotor (9) rotatable around an axis X and a stator (8), the rotor (9) being arranged in an interior of the stator (8) and separated from the stator (8) by an annular air gap space (300);
a clutch (2) coaxial with the electrical machine, the clutch comprising a reaction plate (10), the reaction plate (10) being integral in rotation with the rotor (9) and placed at an axial distance from the rotor (9) in order to provide a space between the electrical machine (3) and the reaction plate (10); and
an anti-dust flange (301) arranged axially in the space between the electrical machine (3) and the reaction plate (10), and extending radially so as to cover the annular air gap space (300);
the stator (8) comprising a plurality of assembly pins (306),
the anti-dust flange (301) comprising a plurality of holes (307) arranged at right angles to the pins (306) for permitting assembly by coupling of the pins (306) with the corresponding holes (307).

18. The device according to claim 17, wherein each of the pins (306) passing through one of the holes (307) in the anti-dust flange (301) comprises a head (308) which retains the anti-dust flange (301) on the stator (8).

19. The device according to claim 17, wherein the pins (306) are made of plastic which is fusible by ultrasound.

20. The device according to claim 17, wherein the anti-dust flange (301) is secured on the stator (8).

21. The device according to claim 17, wherein the anti-dust flange (301) is made of a material with magnetic susceptibility having a value of less than $1 \cdot 10^{-3}$ to magnetically shield the electrical machine (3).

22. The device according to claim 17, wherein the anti-dust flange (301) is made of plastic material comprising non-magnetic metal fillers to magnetically shield the electrical machine (3).

* * * * *